United States Patent [19]

Fleischer

[11] 4,062,573
[45] Dec. 13, 1977

[54] CLAMPING DEVICE

[76] Inventor: Henry Fleischer, 18 Notch Park Road, Little Falls, N.J. 07424

[21] Appl. No.: 658,582

[22] Filed: Feb. 17, 1976

Related U.S. Application Data

[60] Division of Ser. No. 479,667, June 17, 1974, abandoned, which is a continuation-in-part of Ser. No. 427,149, Dec. 21, 1973, abandoned.

[51] Int. Cl.² ............................................. F16L 33/22
[52] U.S. Cl. .................................. 285/116; 285/243; 285/320
[58] Field of Search ............... 285/243, 255, 116, 115, 285/253, 252, 257, 320, 317

[56] References Cited

U.S. PATENT DOCUMENTS

| | | | |
|---|---|---|---|
| 767,893 | 8/1904 | Jewell | 285/243 |
| 1,113,080 | 10/1914 | Wilson | 285/243 |
| 1,367,246 | 2/1921 | Ewald | 285/116 |
| 1,815,660 | 7/1931 | Walker | 285/317 |
| 2,253,691 | 8/1941 | Darling | 285/243 |
| 2,280,892 | 4/1942 | Cowles | 285/243 |
| 2,428,176 | 9/1947 | Parker | 285/116 |
| 3,087,746 | 4/1963 | Hamilton et al. | 285/243 |
| 3,088,756 | 5/1963 | May | 285/116 |

Primary Examiner—Thomas F. Callaghan

[57] ABSTRACT

There is provided a clamping member for attaching one part of a two part coupling device to a conduit, such as a hose, said clamping member comprising a body section having a bore running therethrough and comprising a first end portion, an intermediate portion and a second end portion, said first end portion being adapted to be connected to one part of the two part hose coupling device. The clamping member further includes at least a pair of spaced apart clamping rods each of which is pivotally connected to the body section of the clamping member, each of said clamping rods including a clamp section connected at one end of said rod, and an annular ring disposed about said body section in contact with said clamping rods, so that when a hose is inserted in the second end portion of the body section, the annular ring member can be positioned so as to bear against the connecting rods and force the connecting rods to be pivoted downwardly so that the clamp section thereof will be forced against the hose and thereby hold the hose in said body section.

10 Claims, 4 Drawing Figures

CLAMPING DEVICE

REFERENCE TO OTHER APPLICATIONS

This application is a Divisional application of application Ser. No. 479,667, filed June 17, 1974, now abandoned, which is a Continuation-In-Part of application Ser. No. 427,149 filed Dec. 21, 1973, now abandoned.

FIELD OF THE INVENTION

The present invention relates to a clamping member which can be employed to connect one part of a two part coupling device to a hose, such connection and/or subsequent disconnection being effected manually without the need for employing tools.

BRIEF STATEMENT OF THE INVENTION

The present invention provides a clamping member for attaching one part of a two part hose coupling device such as described in application Ser. No. 479,677 filed June 17, 1974 and the continuation-in-part thereof, such as the socket member or the plug member, to a hose. The clamping member comprises a body section having a bore running therethrough and includes a first end portion, an intermediate portion and a second end portion, the first end portion being adapted to be connected to one part of the two part coupling device, said one part of the coupling device including a tubular end portion having a bore running therethrough, such as a conventional nipple. The clamping member will also include at least a pair of spaced apart clamping rods, each of which is pivotally connected to the body section of the clamping member, each of said clamping rods including a clamp section connected at one end thereof. An annular ring member is disposed about the body portion of the clamping member in contact with the clamping rods, so that when a hose is inserted in the second end portion of the body section, the annular ring member can be positioned so as to force the connecting rods to be pivoted downwardly so that the clamp sections thereof will be forced against the hose and thereby hold the hose in place in the body portion and in communication with the one part of the coupling device. The unique clamping members as described above will allow attachment of the components of the coupling device to conduit sections, such as to two hoses, by hand, without the need for employing wrenches or other tools. Furthermore, the unique clamping members may include a protective cover or sleeve which protects these devices from the impact received upon dropping the same on hard surfaces.

DETAILED DESCRIPTION OF PREFERRED EMBODIMENTS

Figure 1:
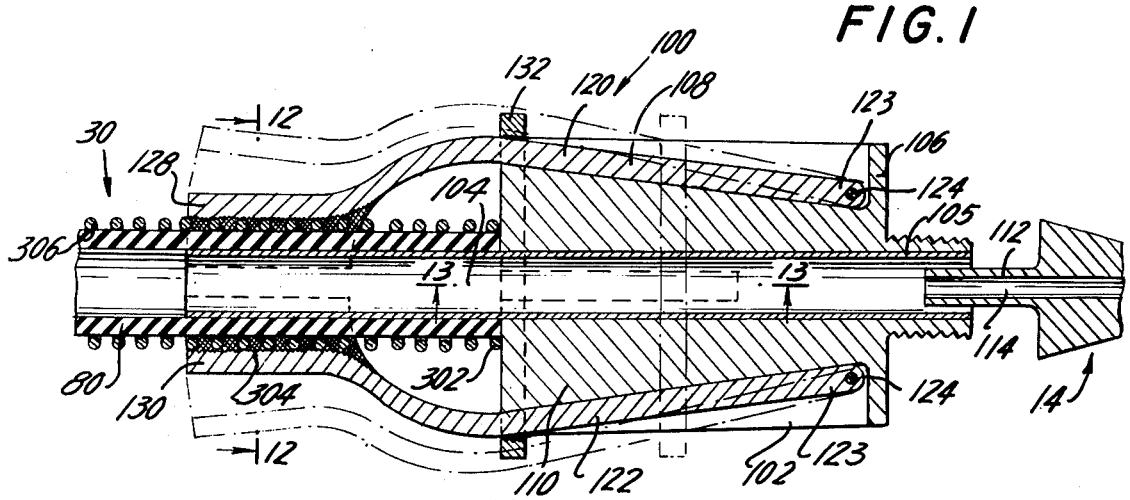
FIG. 1 is a sectional view of a clamping member in accordance with the present invention.
Figure 2:
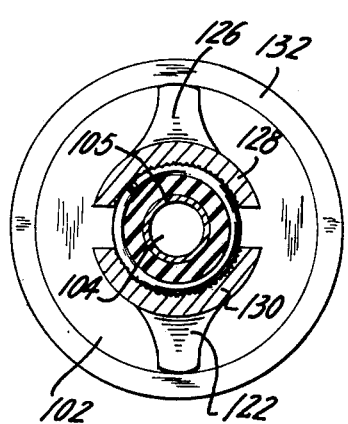
FIG. 2 is a view of the clamping member shown in FIG. 1 taken along lines 12—12.

Referring now to the accompanying Figures wherein like parts are represented by like numerals in the several views, in FIGS. 1 and 2, a clamping member in accordance with the present invention is shown and is identified generally by the numeral 100. The clamping member 100 is employed for attaching one part of a two part coupling device, such as for example, the plug member 14 or a socket member (not shown for drawing clarity), to a hose section 80 as shown in FIG. 1. The clamping member 100 comprises a body section 102 having a bore 104 running therethrough defined by inner walls of the body section 102. The body section 102 comprises a first end portion 106, an intermediate portion 108 and a second end portion 110. The first end portion 106 is adapted to be connected to the one part of the two part coupling device, such as the second end portion of the plug member 14. Disposed within the bore 104 is sleeve 105 which aids in securing a hose to the clamping member as will be described hereinafter.

The second end portion of the plug member 14 will include a nipple or tubular extension 112 which is adapted to be seated in and extend into the bore 104 and sleeve 105 of the body section 102. It will be appreciated that the nipple 112 of the plug member 14 will have a bore 114 which communicates with the bore 104 of the body section when the nipple 112 of the plug member 14 is seated in the body section 102.

The clamping member will include at least a pair of spaced apart clamping rods 120, 122 each of said rods being pivotally connected at one end portion (123) thereof to the body section of the clamping member by means of pivot pins 124 as shown. The other end of the clamping rods 120, 122 will include clamp sections 128, 130, respectively, which are adapted to be pressed against the surface of the hose section 80. The clamp sections 128, 130 will preferably include gripping surfaces, such as ribbed inner surfaces to aid in gripping of the hose section.

The clamping member will also include an annular ring member 132 disposed about the body portion 102 in contact with the clamping rods 120, 122 as shown. When a hose section is inserted in the second end portion 110 of the body section about the sleeve 105, so that the hose is seated between the sleeve 105 and the body portion of the clamping member, the annular ring member can be positioned so as to force the connecting rods 120, 122 to be pivoted downwardly so that the clamp sections 128, 120, respectively, thereof, will be forced against the hose, thereby forcing the hose against the sleeve 105, and holding the hose in place in the body portion 102, and in communication with the plug member, as shown in FIG. 1.

The clamping rods 120 and 122 will preferably be positioned on the body portion 102 of the clamping member 100 so that the clamp sections 128, 130 are disposed oppositely with respect to each other and are in contact with opposite surfaces of the hose section 80, when the clamp sections are in their closed position, as shown in FIG. 1. It is preferred that the clamp sections 128, 130 are formed with a slight curvature or arc so that they can be positioned about substantially any diametered hose in a manner such that the clamp sections will not ordinarily contact each other when in their closed position.

Figure 4:
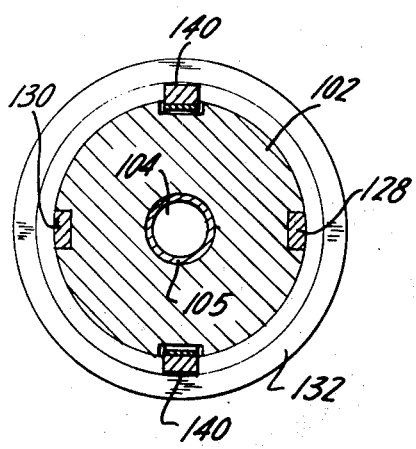
FIG. 4 is a view of the clamping member shown in FIG. 3 taken along lines 14—14.
Figure 3:
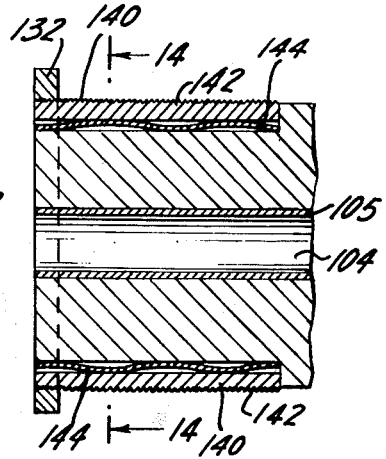
FIG. 3 is a view of the clamping member shown in FIG. 1 taken along lines 13—13.

As seen in FIGS. 1, 3 and 4 the body section 102 of the clamping member 100 may include a pair of depressible members, each generally indicated by the number 140, each of which depressible members preferably comprises an elongated spring-loaded bar 142, having knurled or ribbed portions as shown, which is in communication with leaf spring 144. The depressible or spring-loaded bar is adapted to bear against the annular ring 132 when in its normal or up position so as to prevent movement of the ring 132. When it is desired to close the clamping rods and clamp sections about a hose section, the depressible member or rod 142 can be pressed downwardly into said body section 102 of said clamping member 100 so as to allow movement of the ring member 132 towards the clamp sections 128, 130, thereby causing the clamping rods 120 and 122 to be pressed towards the hose section 80 and thereby cause the clamp sections 128, 130 to be pressed and held against the hose section 80.

As shown in FIG. 1, the clamping member of the invention may also include a coiled reinforcing spring member 300 one end 302 of which is adapted to be connected to the body section 102 of the clamping member and the intermediate portion 304 and end portion 306 are adapted to encircle a hose section 80 when the hose section is held in place in the body section 102 by the clamping rods 120, 122 and clamp sections 128, 130, respectively. The reinforcing spring member will prevent snapping of the hose section 80 near the portions of the hose which extend from the body section 102 of the clamping member. Such portions of the hose section 80 are subject to constant bending and strain. The spring member 300 will aid in absorbing such forces on the hose section.

It will also be appreciated that a similar coiled reinforcing spring member may be connected by conventional fastening means, to a socket member (not shown for drawing clarity) where such socket member is directly attached to a hose section. In addition, such a reinforcing spring member may be attached, by conventional fastening means to the plug member 14.

What is claimed is:

1. A clamping member for attaching one part of a two part hose coupling device to a hose, comprising, in combination, a body section having a bore running therethrough, and comprising a first end portion, an intermediate portion and a second end portion, said first end portion being adapted to be connected to one part of a two part hose coupling device; at least a pair of spaced apart clamping rods each pivotally connected to said body section of said clamping member, each of said clamping rods including a clamp section connected at one end of said rod; and rod moving means disposed about said body section in contact with said clamping rods so that when a hose is inserted in said second end portion of said body section said rod moving means can be positioned so as to force said connecting rods to be pivoted downwardly so that the clamp sections thereof will be forced against said hose and thereby hold said hose in place in said body section and in communication with said one part of said coupling device, said rod moving means member comprising a ring member disposed about said body section of said clamping member, and further including ring retaining means in communication with said ring member, said ring retaining means comprising an upwardly bearing depressible member axially fixed in said body section of said clamping member and disposed below said ring member, said depressible member being adapted to move radially between up and down positions, so that when said depressible member is in its normal up position, it bears upwardly on said ring member thereby preventing movement of said member.

2. The clamping member in accordance with claim 1 wherein said clamping rods are positioned opposite each other on said body section so that said clamp sections are in contact with opposite surfaces of said hose.

3. The clamping member in accordance with claim 1 wherein said clamp sections are spaced from each other when disposed in contact with said hose.

4. The clamping member in accordance with claim 1 further including an inner sleeve member disposed within said bore of said body section of said clamping member, in a manner such that when a hose section is fitted within said clamping member, a portion of said hose is disposed over at least a portion of said inner sleeve member.

5. The clamping device in accordance with claim 1 wherein said depressible member comprises a spring-loaded elongated rod, which rod bears against said ring member when said rod is in its normal up position.

6. The clamping member in accordance with claim 1 wherein said clamping rods comprise a first end portion, an intermediate portion and a second end portion and said clamp sections are connected to said second end portions thereof.

7. The clamping member in accordance with claim 6 wherein said first end portions of said clamping rods are pivotally connected to said body section of said clamping member and said rod moving means comprises a ring member which is disposed about said clamping rods in a manner such that when said ring member is moved toward said clamp sections of said clamping rods, said clamping rods will be forced downwardly toward said body section and said hose seated therein.

8. The clamping member in accordance with claim 1 further including a coiled reinforcing spring member, one end of which is secured to said clamping member, in a manner such that when a hose is seated in said body section of said clamping member, said spring member encircles at least a portion of said hose.

9. The clamping member as defined in claim 1 wherein said upwardly bearing depressible member comprises a springbiased upwardly bearing compressible member.

10. The clamping member as defined in claim 1 further including a second upwardly bearing depressible member.

* * * * *